W. G. MYLIUS & B. G. LA BAR.
ELECTRICAL MEASURING INSTRUMENT.
APPLICATION FILED AUG. 9, 1916.

1,248,527.

Patented Dec. 4, 1917.

WITNESSES:
Fred. A. Lind
J H Procter

INVENTOR
Walter G. Mylius
Bert G. LaBar
BY
Wesley S. Carr
ATTORNEY

UNITED STATES PATENT OFFICE.

WALTER G. MYLIUS, OF WILKINSBURG, AND BERT G. LA BAR, OF TURTLE CREEK, PENNSYLVANIA, ASSIGNORS TO WESTINGHOUSE ELECTRIC AND MANUFACTURING COMPANY, A CORPORATION OF PENNSYLVANIA.

ELECTRICAL MEASURING INSTRUMENT.

1,248,527.  Specification of Letters Patent.  Patented Dec. 4, 1917.

Application filed August 9, 1916. Serial No. 113,894.

*To all whom it may concern:*

Be it known that we, WALTER G. MYLIUS, a citizen of the United States, and a resident of Wilkinsburg, in the county of Allegheny and State of Pennsylvania, and BERT G. LA BAR, a citizen of the United States, and a resident of Turtle Creek, in the county of Allegheny and State of Pennsylvania, have invented a new and useful Improvement in Electrical Measuring Instruments, of which the following is a specification.

Our invention relates to electrical measuring instruments and particularly to light-load adjusting devices for such instruments.

The object of our invention is to provide a device of the above indicated character that shall be simple and cheap to construct, effective in its operation and easily adjustable.

In the carrying out of our invention, we provide a supporting member, a movable short-circuited conductor, a worm wheel operatively connected to the conductor, a worm screw for actuating the worm wheel and a single resilient member that is operatively connected to the worm wheel and the worm screw for securing the same to the supporting member and for holding them in effective engagement.

Figure 1:
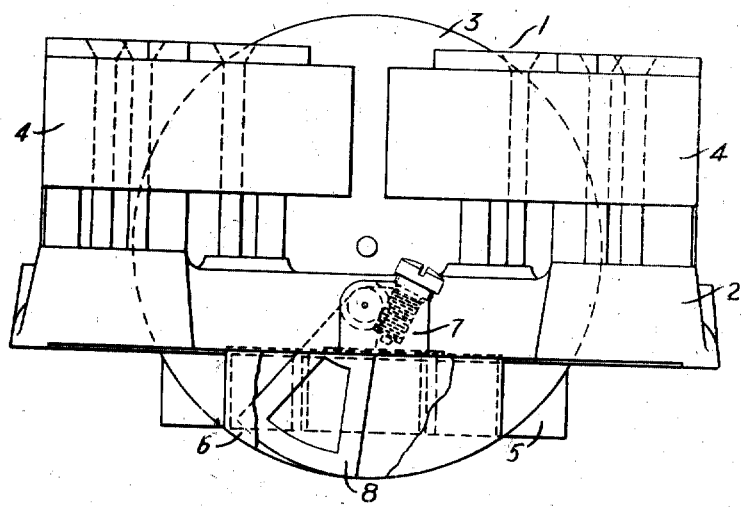
Figure 2:
Figure 4:
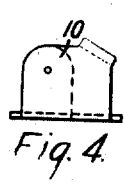
Figure 5:
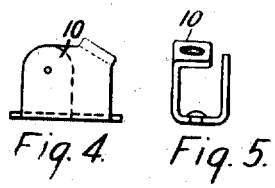
Figure 3:
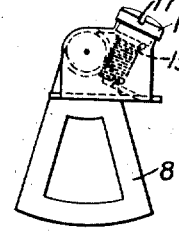
Figure 6:
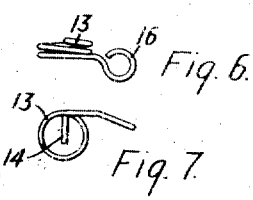
Figure 7:

Figure 1 of the accompanying drawings is a plan view, partially broken away, of an electrical measuring instrument embodying our invention, Figs. 2 and 3 are detail elevational and plan views, respectively, of the light-load adjusting device embodying our invention, Figs. 4 and 5 are detail front and side elevational views, respectively, of the supporting member embodying our invention, and Figs. 6 and 7 are detail plan and elevational views, respectively, of the spring embodying our invention.

An electrical measuring instrument 1 comprises a supporting frame 2, a rotatable armature 3, damping magnets 4 and a magnetizable core member 5. A keeper or magnetizable member 6 is mounted on the frame 2 adjacent and parallel to the faces of the pole pieces of the magnetizable core member 5, and a light-load adjusting device 7 is provided for the purpose of so controlling the torque of the armature 3 that it will develop a sufficiently large torque to overcome the friction of the instrument at relatively light loads.

The light-load adjusting device 7 comprises a closed-circuit conductor 8 that is fixedly mounted on a spindle 9 which is supported by a housing or supporting member 10. The supporting member 10 is mounted on the frame 2 and it is provided with openings to receive the spindle 9 and a worm screw 11. A worm wheel 12 is mounted on the spindle 9, and a helical spring 13 surrounds the spindle 9 and is operatively connected thereto at one of its ends 14. The worm screw 11 is provided with an annular recess 15, at its upper end, in which is disposed the other end 16 of the spring 13. The worm screw 11 is provided with a slit 17 in its head for receiving a screw driver or other similar actuating device.

When the worm screw 11 is turned, it is adapted to drive the worm wheel 12 and, consequently, the conductor 8. But, since the turning of the spindle 9 tensions the spring, and since the tensioning of the spring tends to bind the turning of the screw 11, it will be understood that the spring 13 will so coöperate with the worm screw 11 and the worm wheel 12 as to preclude the movement of the conductor 8 unless the worm screw 11 is turned. Since the end 14 of the spring 13 is inserted in an opening in the spindle 9, it holds the spindle in position in the supporting member 10. Similarly, since a portion of the spring 13 is disposed in the annular recess 15 of the worm screw 11, it holds the same in position in the supporting member 10.

If the closed-circuit conductor 8 is disposed adjacent the pole pieces of the magnetizable core member 5 and the armature, it will be understood that, for different positions relative to the pole pieces, it will either assist or oppose the torque of the armature. Thus, if the conductor 8 is so disposed, by turning the worm screw 11, that it will cause the armature to develop just sufficient torque to overcome the friction of the instrument, the armature will be required to develop only a torque in accordance with the energy to be measured. With our device, the conductor 8 will remain in any position to which it is moved by the movement of worm screw 11, and the spring 13 will so hold it in that position that it will not be moved inadvertently.

While we have illustrated our invention in connection with the light-load adjusting device of an electrical measuring instrument, it will be understood that its application is not so limited, since it may be variously modified within the spirit and scope of the invention, as set forth in the appended claims.

We claim as our invention:

1. The combination with a supporting member, of a spindle, a worm wheel mounted on the spindle, a worm screw adapted to engage the worm wheel, and a spring adapted to surround the spindle, one end of the spring being attached to the spindle and the other end being adapted to hold the worm screw in position in the supporting member.

2. The combination with a supporting member, of a spindle, a worm wheel mounted on the spindle, a worm screw adapted to engage the worm wheel, and a single resilient means for holding the worm screw and the spindle in the supporting member and for so securing the worm wheel and worm screw together that the spindle will turn only when the worm screw is turned.

3. The combination with a supporting member, of a rotatable worm wheel, a worm screw, and a single means for holding the worm wheel and the worm screw in engagement within the supporting member.

4. The combination with a supporting member, of a movable conductor, a worm wheel operatively connected to the conductor, a worm screw, and means for securing the worm wheel and worm screw in engagement and in position in the supporting member.

5. The combination with a supporting member, of a worm wheel, a worm screw, and a spring for securing the worm wheel and screw in engagement and in position in the supporting member.

6. In a light-load adjusting device for electric meters, the combination with a movable conductor, of a supporting member, a worm wheel operatively connected to the movable conductor, a worm screw, and a spring for securing the worm wheel and the screw in position in the supporting member.

7. In a light-load adjusting device for electric meters, the combination with a movable conductor, of a supporting member, a worm wheel operatively connected to the movable conductor, a worm screw, and a spring for securing the worm wheel and the screw in position in the supporting member and for so securing the worm screw in engagement with the worm wheel that the conductor may be moved only by turning the worm screw.

In testimony whereof, we have hereunto subscribed our names this 21st day of July, 1916.

WALTER G. MYLIUS.
BERT G. LA BAR.